Figure 1:
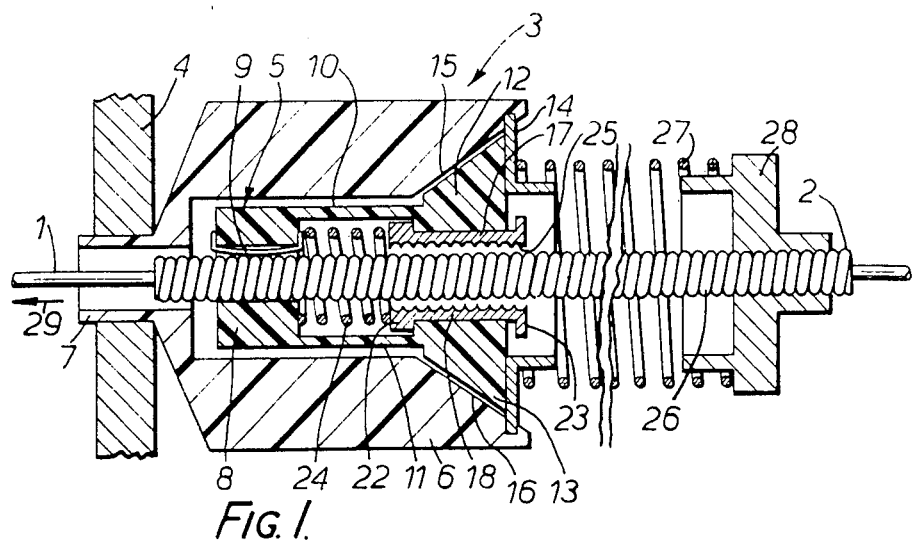
Figure 2:
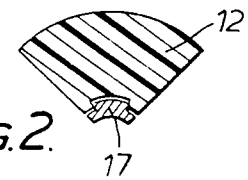
Figure 3:
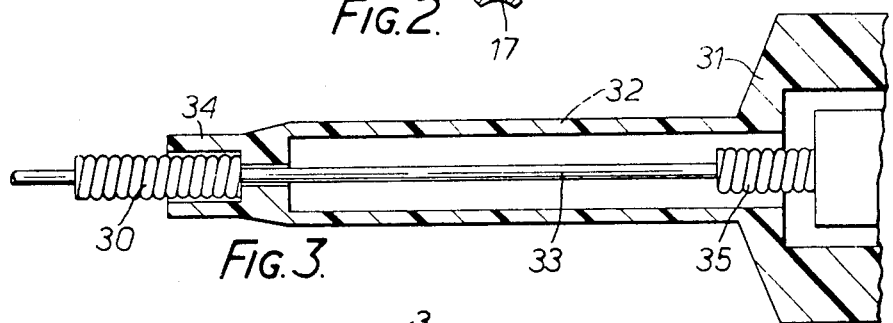

United States Patent [19]

Hoyle

[11] Patent Number: 4,690,262

[45] Date of Patent: Sep. 1, 1987

[54] CLUTCH CONTROL CABLE WITH AUTO-ADJUSTER

[76] Inventor: Edgar Hoyle, 193 The Street, Boughton, Faversham, Kent, ME13 9BH, United Kingdom

[21] Appl. No.: 774,600

[22] PCT Filed: Jan. 4, 1985

[86] PCT No.: PCT/GB85/00005
§ 371 Date: Sep. 5, 1985
§ 102(e) Date: Sep. 5, 1985

[87] PCT Pub. No.: WO85/03113
PCT Pub. Date: Jul. 18, 1985

[30] Foreign Application Priority Data

Jan. 5, 1984 [GB] United Kingdom ............... 8400134

[51] Int. Cl.⁴ ............................................. F16D 11/00
[52] U.S. Cl. ........................... 192/111 A; 188/196 B
[58] Field of Search ............... 192/111 A, 70.25; 188/2 D, 71.8, 196 B, 196 P

[56] References Cited

U.S. PATENT DOCUMENTS 4,344,518  8/1982  Gilmore ..................... 192/111 A Primary Examiner—Carl D. Friedman
Attorney, Agent, or Firm—Dennison, Meserole, Pollack & Scheiner

[57] ABSTRACT

A self-adjusting engine clutch control cable comprising a movement-transmitting core (1) sliding within a guiding conduit (2) is provided with a self-adjustment device comprising a clamp (3) for releasably connecting one end portion of the conduit (2) to an abutment (4). A clamp component (5) is connected to one end portion of the conduit (2) by a slip-coupling (9). When a load (29) is applied to the core (1) by depression of the clutch pedal, movement of that end portion of the conduit is transmitted to component (5) via the slip coupling. Jaw elements (17,18) of that component (5) close onto that conduit portion while permitting it to advance in the clamp against biasing spring (27). On its release, that conduit portion moves back to a position depending on the action of spring (27) and on any end-of-cycle cable loading imposed by the clutch clamping spring as a result of clutch wear.

15 Claims, 7 Drawing Figures

CLUTCH CONTROL CABLE WITH AUTO-ADJUSTER

This invention relates to a clutch control cable which comprises a flexible movement-transmitting core within a flexible guiding conduit and which is associated with a self-adjustment device which allows automatic adjustment of the cable to take place to compensate for clutch wear.

As is well known, engine clutch control cables require periodic adjustment to compensate for clutch wear. In the absence of adjustment of the control cable, clutch wear will result in the clutch being held out of proper engagement by the cable when the clutch pedal or other actuating member reaches the end of its release movement. And in consequence the cable will then still be under some load, imposed by the clutch clamping spring. Over the course of the last decade, considerable research and design skills have been applied by automobile and automobile component manufacturers to the production of adjusters which allow the effective length of the cable to alter under any such residual loading so that the required adjustments take place automatically in course of the continuing use of the cable. As a result of these efforts a considerable variety of self-adjustment devices have been proposed, as is evident from the available patent literature (see e.g. United Kingdom Pat. Nos. 1181920 and 1411467; United Kingdom Patent Application Nos. 2 016 634 A, 2 088 501A and 2 088 502A, and European Patent Application Nos. 0 030 494, 0 048 620 and 0 055 649).

Some prior art devices form a self-releasing coupling between the control cable and the clutch pedal (see the above mentioned United Kingdom Pat. Nos. 1181920, 1411467 and 1235083). According to more recent proposals a self-adjustment device is provided as part of a self-adjusting cable unit and takes the form of an automatically releasing clamp for connecting the guiding conduit of the cable to some form of abutment. The clamp includes a component which is mechanically linked to the core of the cable so that such component becomes axially displaced during a first part of each depression of the clutch pedal from rest. That axial movement of the clamp component causes the clamp to close onto the conduit. At or near the end of the return, release stroke of the clutch pedal, the clamp opens, so allowing the adjacent part of the conduit to move axially, relative to the clamp, under any load which may then still be applied to the cable by the clutch clamping spring.

In some such known devices incorporating an automatically releasing conduit clamp, the axially displaceable clamp component is spring-loaded towards its closed condition and is forced into its release position at the end of the return stroke of the clutch pedal by an abutment secured to the core of the cable (see e.g. the aforementioned European Patent Application No. 0 030 494). In other such devices, the clamp component is connected to the core by a slip coupling and becomes displaced towards clamping position at the commencement of the clutch-disengaging stroke of the clutch pedal by force transmitted to such component from the core via that coupling (see International Application PCT/GB83/00225).

Although self-adjustment devices which function satisfactorily can be made on the basis of at least some of the previously proposed designs, they all necessitate the presence of one or more features which make the design incompatible with the fulfilment of cost, reliability and installation conditions which are sometimes required by vehicle manufacturers.

The present invention provides a clutch cable with a self-adjusting facility based on a new design principle which enables certain hitherto unfulfilled combinations of attributes to be achieved.

According to the present invention, there is provided an engine clutch control cable which comprises a flexible movement-transmitting core within a flexible guiding conduit and which is associated with a self-adjustment device comprising a clamp via which the conduit can be connected to an abutment for sustaining reaction load on the conduit, which clamp automatically closes and opens in dependence on axial advance and retraction movements respectively of a component of the clamp during a movement cycle of the cable core when the cable is in use, characterised in there is a slip coupling between said clamp component and the conduit of the cable, by which coupling, when the cable is in use, axial advancing motion of a part of said conduit which occurs responsive to application of load to the cable at the start of the clutch-disengaging stroke of the core is transmitted to said clamp component thereby advancing such component, and such transmited motion results in closure of the clamp; and in that there is (i) means for biasing said conduit part towards retraction from the clamp, and (ii) means which allows the position along said conduit at which it is engaged by said slip coupling when the control is in its rest position to alter from cycle to cycle under end-of-cycle load on the cable resulting from clutch wear.

The invention involves a departure from prior art teaching, in that in a cable according to the present invention, closure of the conduit clamp is "triggered" directly by movement of part of the conduit. This conduit movement is movement resulting from the reaction force imposed upon the conduit when the clutch pedal or other actuating member commences its clutch-disengaging stroke. The slip coupling serves to transmit this conduit movement to the axially displaceable clamp component. In order to ensure that any residual load imposed on the cable at the end of the return stroke of the clutch-operating cycle in consequence of clutch plate wear will reliably bring about the necessary compensating movement of the conduit relative to the clamp, the cable incorporates additional means which allows changes in the end-of-cycle forces on the cable to alter the position of the conduit relative to the said clamp component.

In a control cable acording to the present invention, the amount of relative movement in each operating cycle between the axially displaceable clamp component and the cable conduit can be very slight so that wear in the slip coupling can be discounted. More importantly, the friction coupling does not impose additional frictional restraint on the movement of the core so that the coupling design is not critical for the operating efficiency of the cable. This is in contrast to prior proposed mechanisms wherein there is a slip-coupling between an axially displaceable clamp component and the cable core, because in that case the core has to work against the restraint of the coupling over the major part of each core stroke.

It is easily possible for a self-adjustment device of a cable according to the present invention to be constructed so that it will function regardless of which end portion of the conduit is anchored to a fixture, provided the said device is appropriately orientated in relation to the conduit. Therefore the conduit can be anchored at its end nearer the clutch pedal or other actuating member and the clamp unit can be located at the clutch end of the conduit and be orientated so as to move from release to clamping condition responsive to movement of that clutch end of the conduit towards the clutch. The possibility of locating the clamp unit at or near the end of the conduit which is nearer the clutch is of advantage in circumstances where the most suitable fixing point for the clamp unit is in that region of the installation space.

Preferably, the clamp component which engages the conduit, and the conduit itself, have inter-engaging teeth, whereby a positive interlocking engagement of the clamp with the conduit is achieved. In these circumstances axial movement of the conduit relative to the axially displaceable clamp component becomes blocked as soon or almost as soon as there is some degree of intermesh between the teeth of those components. Once some degree of intermesh has occurred the reaction force on the conduit will be transmitted from the conduit to the said clamp component and force it into its full clamping position. Therefore while the closure of the clamp results from the initial advancing motion transmitted to the clamp component from the conduit, such initial advancing motion has only to be directly responsible for partial closure of the clamp. Completion of closure follows in consequence of the load on the conduit. The slip resistance of the slip coupling can therefore be lower than would otherwise be necessary.

As an alternative to a toothed clamp component which intermeshes with the conduit, the clamp can be of ball and cone type as known per se in the art. In that case the axially displaceable clamp component which is connected to the conduit by the slip-coupling can be be a ball cage, advance of which causes the balls to ride along wedge faces which force the balls radially inwardly against the conduit of the control cable.

In preferred embodiments of the invention, the clamp has an axial open-ended conduit passageway and the self-adjustment device can function with the cable conduit extending right through the clamp. Such preferred embodiments afford the important advantage that the adjustment range is not determined by the length of the clamp. A very large adjustment range is possible even when using a short, compact clamp unit. This advantage is unattainable by self-adjusting cables as hitherto proposed. In prior art cables wherein a conduit clamp is mechanically linked to the cable core, the clamp must bridge the conduit end and the core and must therefore define sufficient interior space to allow the conduit end to move into the clamp over the maximum required adjustment range. Consequently the length of the clamp must be commensurate with whatever adjustment range is required. Some vehicles, various commercial vehicles for example, require a large clutch cable adjustment range amounting to several inches and because of the space requirements of the prior art devices they are not well suited to those circumstances.

As has already been said, the self-adjustment device of a cable according to the invention includes: (i) a means for biasing the conduit towards retraction from the clamp and (ii) a means for causing or allowing such relative axial motion between the conduit and the clamp as may be required to compensate for clutch wear.

The means (i) can be a compression or tension spring depending on the way it is mounted and on whether the cable control is for transmitting pull or push forces. The spring may for example be a helical spring which surrounds a part of the conduit and which at one end bears against or is connected to the clamp and at its other end bears against or is connected to a region of the conduit. In Bowden-type flexible control cable installations it is known to provide such a compression or tension spring which serves to take up slack in the cable and in regard to this feature it therefore suffices to follow this conventional practice.

The means (ii) for causing or allowing such relative axial motion between the conduit and the clamp as may be required to compensate for clutch wear can take any of a variety of forms. For example the clamp may be formed to cause or allow the part of the conduit with which it co-operates to undergo, against a spring bias, an excess axial movement in the compensating direction each time the clamp moves towards its conduit-clamping condition, with the result that although springbiased retraction of the conduit relative to the clamp will always occur when the clamp is opened, the extent of such retraction will depend on the opposing force, if any, imposed on the conduit consequent upon clutch plate wear.

If the axially displaceable clamp component and the conduit have inter-engaging teeth as hereinbefore referred to, the said means (ii) can be constituted by the teeth of one or both of such components if such teeth are suitably shaped. In other words, the teeth can be shaped so that the teeth of the said clamp component impart an axial movement to the co-operating part of the conduit by cam action as they move against the conduit teeth. Such a camming action can suffice to ensure an excess compensatory movement of the conduit as above referred to and thereby allow the conduit to be brought on its subsequent retraction by the biasing means (i), to a rest position (relative to the clamp) which is subject to change in course of time in response to clutch wear.

As another example, the said means (ii) can comprise a stop on the core of the cable. The latter form is however not so satisfactory because it prevents the conduit from projecting right through the clamp and the adjustment range is therefore limited by the length of such device.

The self-adjustment device, including means (i) and (ii), preferably forms with the control cable a unitary assembly which can be handled and installed as such. However in certain constructions the means (i) and/or (ii) can be extraneous to the cable control itself and can be supplied by the user at the time the cable is installed. Either of such means can be supplied at that time as an ancillary component to be fitted to the cable. For example, in a pull control, the means (i) can be constituted by a cable tensioning spring as commonly used in Bowden-type cable installations for slack take-up purposes. The means (ii) can easily be fitted by the user for example in the case that it is simply a stop on the core of the cable as hereinbefore referred to. Or, instead of being an ancillary component fitted to the cable control, either of said means (i) and (ii), particularly the means (ii), can be constituted by an inherent feature of a clutch system with which the cable is eventually used. The present invention therefore includes a control cable with self-adjustment device as claimed in claim 10 hereof, such cable and self-adjustment device being as hereinbefore defined but without the biasing means (i).

The conduit of the control cable can be flexible over its entire length. Alternatively it can be provided with a rigid section, e.g. a rigid end fitting, of sufficient length to cover the maximum required adjustment range, for co-operating with the clamp unit.

The flexible cable can be and preferably is of Bowden-type as conventionally understood, i.e. it can comprise a flexible wire or stranded wire core in direct sliding contact with the guiding conduit or with a conduit liner. Alternatively the cable can be of a form (also known per se) comprising a core in the form of a flexible metal strip which is supported within the guiding conduit by ball or roller bearings.

The clamp can be used for connecting the conduit to a fixture. As an alternative the clamp can connect the associated conduit to a second piece of flexible conduit through which the core extends. That second conduit piece then constitutes a form of abutment via which reaction forces on said associated conduit can be transmitted to a fixture. In other words the clamp can in effect be located within the length of a split-conduit control cable. The lengths of the different conduit pieces can be selected to bring the self-adjustment device to the most suitable position in any given installation space. On the other hand, in such a split-conduit type of control the conduit piece with which the clamp is associated cannot extend right through the self-adjustment device and its length determines the maximum possible adjustment range.

The invention can be embodied in a pull-type or a push-type clutch control cable.

Certain embodiments of the invention, selected by way of example, will now be described with reference to the accomanying diagrammatic drawings in which:

FIG. I is a part-sectional elevation of part of one form of clutch control cable according to the invention;

FIG. II is a detail of the self-adjustment device of that control cable;

FIG. III is a part-sectional elevation of part of a split-conduit form of self-adjusting clutch control cable according to the invention;

FIG. IV is a part cross-sectional elevation of part of another control cable according to the invention;

FIG. V is a cross-sectional elevation of part of the conduit of the control cable shown in FIG. IV;

FIG. VI is a part cross-sectional elevation of part of a control cable according to the invention for transmitting push forces; and FIG. VII is a part cross-sectional elevation of part of a further control cable according to the invention.

Referring to FIG. I, the drawing shows part of a flexible clutch control cable which comprises a core 1 and a conduit 2 within which such core is axially slidable, and which is fitted with a self-adjustment device comprising a clamp 3 via which the conduit 2 can be clamped to a suitable fixture 4 which may e.g. be a bulkhead in the vehicle in which the cable is installed. The clamp comprises a clamp component 5 which is axially displaceable within a casing 6 of the clamp. In this particular embodiment, the casing 6 has an end spigot 7 which is inserted into an aperture in the fixture 4. The said clamp component and casing may, e.g., be moulded plastics components.

The clamp component 5 is a tubular component having a hub portion 8 defining a bore through which the conduit 2 can pass and within that bore there is fitted a leaf spring 9 which exerts a light pressure on the surface of the conduit and thereby forms a slip-coupling. The component 5 is over the remainder of its length divided by longitudinal slots into separate jaws. The component may for example have three or four said longitudinal slots which are uniformly angularly spaced about the axis of the component so that the component has three or four such jaws as the case may be. The drawing shows two such jaws 10,11. Their outer end portions 12,13 are wedge-shaped. The jaws, whatever their number, are identical. In the rest position of the control cable, i.e. in the fully released position of the clutch pedal, the clamp component 5 lies with its jaws abutting an end plate 14 of the casing 6. Axial movement of the component 5 to the left in the aspect of FIG. 1 causes the wedge-shaped end portions of the jaws to ride against inclined faces such as 15,16 on the interior of the casing 6.

Each of the jaws has a toothed element which is slidable relative to the body of the jaw. Toothed elements 17,18 in FIG. I are carried by jaws 10,11 respectively. A suitable slide joint between a jaw body and its toothed element is shown in FIG. II. Each of the toothed elements has inner and outer end flanges such as 22,23 which limit the extent to which the element can move axially relative to the body of its jaw. A compression spring 24 bears at one end against the inside face of the hub portion 8 and at the other end against the toothed elements and urges them into their illustrated positions which are their positions of maximum retraction from the clamp component. The strength of spring 24 is such that the resistance to advance of the toothed elements relative to the body of the clamp component is less than the resitance to movement of the clamp component 5 along the conduit 2 caused by the slip-coupling spring 9. The teeth 25 of the said toothed jaw elements are shaped to intermesh with teeth 26 on the conduit. The part of the conduit with which the jaw elements co-operate can be flexible, like the main part of the conduit length. The teeth 26 can be constituted by one or more male screw threads formed at the surface of the conduit by one or more helically wound wires. Such wire or wires can form the outer surface of the conduit over the whole or over only a part of its length. In the illustrated embodiment, the teeth are formed by the convolutions of a single helically wound wire of circular cross-section.

A light compression spring 27 for holding the cable in tension when installed, surrounds a part of the conduit length adjacent the clamp 3. One end of spring 27 bears against the end plate 14 of the clamp casing and the other end of the spring bears against an abutment 28 on the conduit. This abutment can be a female threaded member which is in screw engagement with the conduit 2 so that the position of the abutment along the conduit, and thereby the tensioning of the cable, can be adjusted by screw action. The tensioning force exerted by this spring is greater than the resistance imposed by the slip-coupling spring 9 to movement of the clamp component along the conduit.

When installed, that end of the core which lies to the left of the clamp 3 in the aspect of FIG. I is connected to the clutch pedal and the remote end (not shown) of the core is connected to a lever, e.g. a declutching fork, of a clutch release mechanism. As already stated, the casing 6 of the clamp 3 is fitted to a fixture 4. The remote end of the conduit 2, i.e. its end which is nearer the clutch, is anchored to a fixture.

The self-adjustment device works in the following manner: When the clutch pedal is depressed to disengage the clutch, the load thereby applied to core 1 and represented by the arrow 29 is transmitted to the conduit 2 and tends to straighten it. The remote end of the conduit cannot move because it is held by a fixture. However because the conduit clamp is open at the start of the clutch pedal movement, the movement of the core is initially accompanied by movement of the illustrated end of the conduit towards the clutch pedal. This movement of the conduit is transmitted to the axially displaceable clamp component 5 via the slip-coupling formed by the leaf spring 9, so that that clamp component likewise moves towards the clutch pedal. After moving a very small distance, e.g. about 0.5 mm, the wedge-shaped portions such as 12,13 of the jaws of the component 5 encounter and begin to ride along the inclined faces 15,16 in the casing 6 and the jaws together with their toothed elements such as 17,18 are thereby moved radially inwards towards the conduit 2. After only a very slight radial movement of said elements, their teeth 25 enter loose intermeshing relationship with the teeth 26 on the conduit. Once teeth 25 have commenced to intrude between teeth 26 on the conduit and flanks of the respective series of teeth are in contact, further axial movement of the conduit end towards the clutch pedal under the applied load causes accompanying axial movement of the toothed elements relative to the body of the clamp component 5, against the light biasing force of spring 24. The radial distances over which the jaws of the clamp component have to be displaced to bring them from their fully open positions, first into a position in which their toothed elements are in loose intermeshing relationship with the conduit teeth 26, and then into a position in which those toothed elements are in full intermeshing and clamping relationship with the conduit, are such in relation to the inclination of the wedge faces 15,16 that following the incidence of the loose intermeshing relationship the toothed elements 17 will be displaced into their fully advanced positions in the clamp component 5 before they become firmly clamped against the conduit. In the fully advanced positions of the toothed elements such as 17,18 their outer end flanges 23 abut the end faces of the clamp component jaws. The axial distance over which the toothed elements can be displaced by the conduit 2 against the action of spring 24 is such that it is in excess of any cable adjustment which might be required to compensate for clutch wear occurring in any one operating cycle of the clutch cable. That distance may for example be about 0.5 mm. The axial movement which requires to be imparted to the clamp component 5 to bring it from its open to its fully closed position in which the conduit is tightly clamped can also be very small, e.g. of the order of 1.0 mm. Once the conduit 2 has become firmly clamped it can sustain the reaction force imposed by the core as it continues its stroke for disengaging the clutch.

During the return stroke of the core for engaging the clutch, the compression load on the conduit decreases and towards the end of that stroke that compression load falls to a value below the tensioning force exerted by spring 27. Consequently that spring starts to retract the adjacent end portion of the conduit relative to the clamp casing 6. This retraction movement of the conduit is transmitted via the slip coupling formed by leaf spring 9 to the clamp component 5 and in consequence the clamping force on conduit relaxes. As soon as the toothed elements move out of intermeshing relationship with the conduit teeth 26, the spring 24 returns those elements to their illustrated retracted positions relative to the clamp component. The retraction of the clamp component is limited by its abutment against the end plate 14 of the clamp casing. If no clutch plate wear has occurred during the operating cycle the tensioning spring 27 will return the illustrated end of the conduit to its original position relative to the clamp. But if clutch plate wear has occurred, it will have the result that at the end of the release movement of the clutch pedal the conduit will be subjected to a residual compressive loading by the clutch clamping spring. This residual loading is opposed to the action of the tensioning spring 27 and will therefore reduce the distance over which the conduit is retracted by the spring relative to the clamp component. When the amount of adjustment required for compensating for cumulative clutch wear exceeds the pitch of the teeth 25,26, the clamp will engage the conduit at a different position on the next ensuing clutch-disengaging stroke of the core. The possibility of this adjustment movement of the conduit relative to the clamp is ensured because the sliding toothed jaw elements such as 17,18 allow the illustrated end portion of the conduit to advance axially through the clamp component at the start of each operating cycle. The extent of that advance should exceed any adjustment which might be required at the end of any operating cycle to compensate for clutch wear occurring in that same cycle.

It will be seen that the conduit 2 can pass right through the clamp so that a large adjustment range is possible despite the relatively small length of the adjustment device. It is of course necessary for the conduit 2 to have an external toothed profile over a sufficient amount of its length to cover the required adjustment range.

FIG. III shows how by a simple modification of the clamp design shown in FIG. 1 it can be adapted for connection to a second conduit piece 30 instead of a fixture. The modification consists simply in the formation of the casing of the clamp 3, which casing in FIG. III is designated 31, to include an elongate tubular extension 32 with an outer end portion 34 for securing to the second piece of flexible conduit. In this instance, the said extension has an end socket in which an end portion of the second conduit piece can be secured, e.g. by a screw connection. The core 33 extends through both pieces of conduit and is connected at one end to a clutch release mechanism and at its other end to the clutch pedal. The outer end (not shown) of conduit piece 30 is secured to a fixture near the site of the clutch pedal and the outer end (not shown) of conduit piece 35 is secured to a fixture near the site of the clutch. The self-adjustment device functions responsive to loading of the cable in precisely the same way as that shown in FIG. I except that once the clamp has closed onto conduit piece 35 at the commencement of each cycle, the compressive load imposed on that conduit piece during the depresion of the clutch pedal is transmitted from the clamp casing to the conduit piece 30 and from that conduit piece to a fixture instead of being transmitted directly from the clamp to a fixture as in FIG. III. It is apparent that the adjustment range is limited by the length of the tubular casing extension 32.

Figure 4:
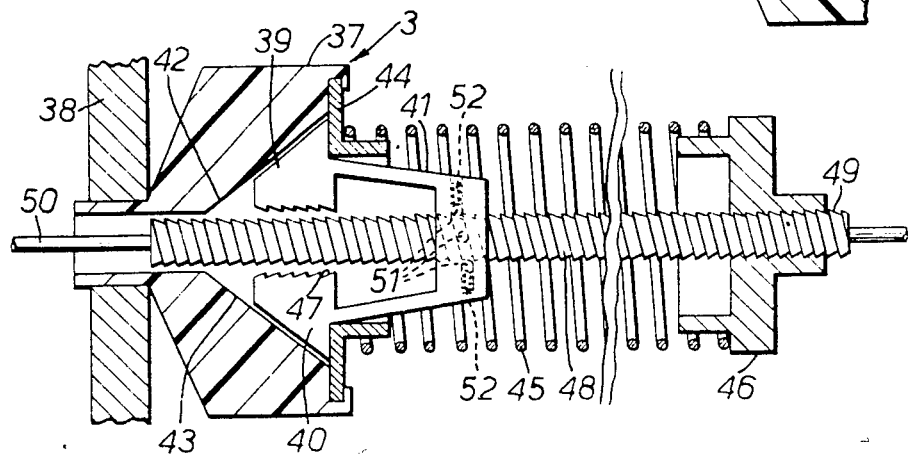
Figure 5:
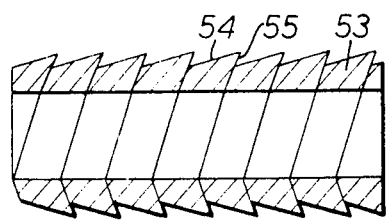

FIG. IV shows part of a cable control which like that shown in FIG. I has an axially displaceable clamp component with toothed jaws for intermeshing with teeth on the conduit. However in the FIG. 4 mechanism the intermeshing teeth are formed so that their co-operation causes an axial advance movement of the engaged portion of the conduit during each closure of the clamp. In consequence it is unnecessary to provide the clamp jaws with sliding toothed elements and an associated biasing spring (24) as in FIG. I. The self-adjustment device according to FIG. IV comprises a clamp 3 having a clamp casing 37 which can be connected to a fixture such as 38 and which accommodates the wedge-shaped portions such as 39,40 of the jaws of an axially displaceable clamp component 41. The said wedge-shaped portions co-operate with an inclined face, or with inclined faces such as 42,43 in the clamp casing and are trapped in such casing by a flanged end ring 44 against which the said wedge-shaped portions abut when the cable is at rest. A cable tensioning spring 45 acts between such end ring 44 and an abutment 46 on the conduit.

Each of the wedge-shaped portions of the clamp component 41 has a series of teeth 47 for intermeshing with teeth 48 on the conduit 49. The co-operating sets of teeth have markedly inclined flanks orientated so that the inclined flanks of the opposed teeth slide one along another during closure of the jaws and thereby exert on the engaged portion of the conduit an axial force which axially advances it relative to the clamp, against the action of the tensioning spring 45. The increment of axial movement thus imparted to the conduit at the commencement of each operating cycle of the cable core 50 is always in excess of any adjustment likely to be required for compensating for clutch wear occurring in any such cycle.

The clamp component 41 is connected to the conduit 49 by a slip-coupling which in this embodiment is formed by a plurality of balls such as 51 which are housed within the hub portion of the clamp component and are biased towards the conduit by springs such as 52. These balls project at the interior of the hub portion and therefore engage between neighbouring tooth portions on the conduit. The resistance to axial displacement of the conduit relative to the clamp component, attributable to this slip coupling, is less than the axial force imposed on the conduit by the tensioning spring 45.

Assuming that there has been no clutch wear: when the clamp is released towards the end of the return, clutch-engaging, stroke of the core, the spring 45 returns the illustrated end portion of the conduit to the same position, relative to the clamp component 41, that it occupied at the commencement of the operating cycle, i.e. before the forward stepping of the cable by the camming action of the intermeshing teeth. However when clutch wear occurs which results in the cable being still subject to some loading by the clutch clamping spring at the end of the release movement of the clutch pedal, that residual load will reduce the retraction of the illustrated end portion of the conduit relative to the clamp component. Automatic adjustment occurs whenever the cumulative clutch wear is sufficient to cause the teeth on the clamp component to engage the conduit at a position one tooth interval behind the position engaged in the preceding cycle.

Conduit teeth of appropriate form for the purpose of a control according to FIG. IV can be formed by suitably shaping a rigid tubular end fitting of the flexible conduit. Alternatively teeth of appropriate form can be formed by helically winding a wire of apropriate cross-sectional shape and size. FIG. V shows part of a conduit formed by such a wire, designated 53. The cross-sectional shape of the wire is such that the teeth have inclined flanks 54 for sliding contact with similarly inclined flanks of teeth on the clamp component jaws and undercut flanks 55 which overhang the thread root. The flanks 55 are undercut to ensure that the teeth of the clamp component when moving into fully intermeshed, clamping relationship to the conduit teeth will reliably impart an axial movement to the engaged part of the conduit. The degree of undercutting is such that that axial movement exceeds any adjustment likely to be required to compensate for clutch wear occurring in any given operating cycle of the cable. The end portion of the conduit with which the clamp jaws co-operate can be flexible or rigid. For example, for imparting rigidity, the wire 53 can be wound onto a rigid tubular support of sufficient length to cover the required adjustment range.

The clamp can be designed so that on closure thereof, the parts of the clamp component which engage the conduit undergo an axial movement which is transmitted to the conduit. For example, referring to FIG. IV, the arms of the jaws which join the wedge-shaped portions of the clamp component 41 to its hub portion can have a geometrical form such that the wedge shaped portions receive an axial component of motion as they move into toothed engagement with the conduit. That movement of the wedge-shaped portions can be used to supplement the camming action of the teeth or even instead of that camming action. In such cases the form of the teeth is not so important.

Figure 6:
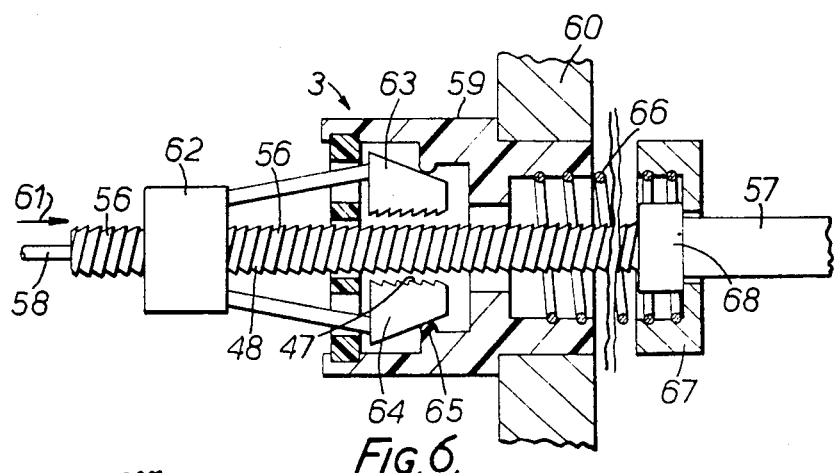
Figure 7:
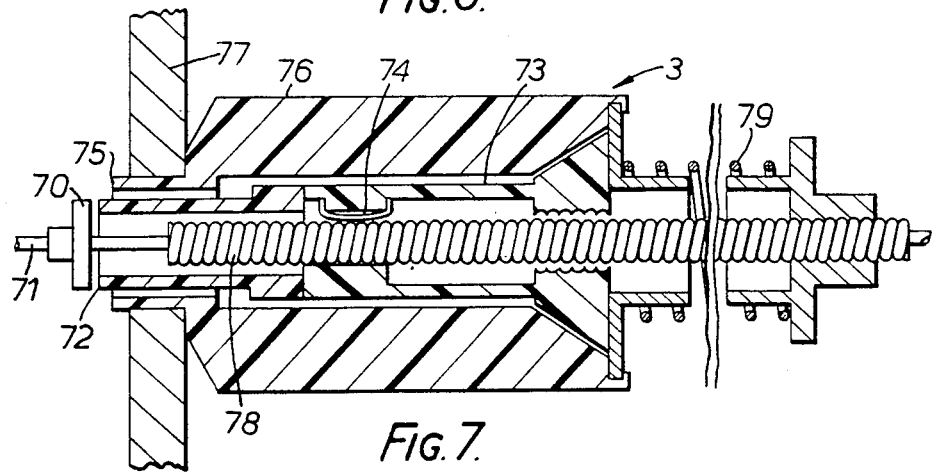

FIG. VI shows a control for transmitting push forces to a clutch release mechanism. The illustrated end portion 56 of the flexible conduit 57 is formed by a rigid tube with an external toothed profile for engagement by the clamp component. The flexible core of the control has a rigid end rod 58 which slides within such rigid tube. The provision of a rigid core end portion sliding within a rigid guiding tube on an end of the flexible conduit is well known per se in flexible push control cables of Bowden-type. The casing 59 of the clamp is connected to a fixture 60. When a push-load is applied to the rod 58 as suggested by the arrow 61 to commence an operating cycle of the control, the force thereby imposed on the flexible conduit causes displacement of its end portion 56 to the right in the aspect of the figure. This movement of the conduit is accompanied by movement of the clamp component 62 which is connected to that conduit end portion by a slip-coupling. This slip coupling can be of the form used in either of the embodiments illustrated by FIGS. I and IV. The wedge-shaped portions such as 63,64 of the clamp component make localised contact with a rib 65 in the casing 59 and are thereby caused to close onto the conduit. The jaws and the conduit have raked intermeshing teeth 47,48 as described with reference to FIGS. IV and V. As in the FIG. IV embodiment, the teeth point in the direction in which the core is moved during the first clutch-disengaging phase of the control cycle. Advancing motion of the illustrated end portion of the conduit relative to the clamp component responsive to the camming action of the intermeshing teeth takes place against the action of a tension spring 66 which keeps the conduit under a light compressive load. Convolutions of that spring at one end thereof are screwed into a female threaded portion of the casing 59 and convolutions of the spring at its other end are screwed into a ring 67 which abuts against a stop 68 on the conduit 57. That stop can be adjustable along the conduit for varying the compressive loading imposed by the spring. The only basic difference between the FIG. 6 embodiment and those previously described are the constructional differences referred to which adapt it to the transmission of push loads. The self-adjustment facility works on precisely the same principle as that of FIG. IV.

FIG. VII shows part of a control wherein the self-adjustment device comprising a clamp 3 is substantially the same as that shown in FIG. I except for the means which allows the end-of-cycle position of the clamp component relative to the conduit to alter from cycle to cycle. In the FIG. VII embodiment, this means comprises a stop 70 secured to the core 71 of the control cable. The inner end 72 of the clamp component 73 which carries a leaf spring 74 forming the slip-coupling, is extended towards the pedal end of the device and in its illustrated retracted position projects slightly from the inner end 75 of the clamp casing 76 abutting against fixture 77. When the control is at rest, the stop 70 rests against the end 72 of the clamp component. If as a result of clutch wear the cable is subjected to residual loading by the clutch clamping spring when the clutch pedal reaches the end of its release movement, this loading will cause the illustrated end portion of the conduit 78 to move to the left in the aspect of the figure, relative to the clamp casing. But for the stop 70 the clamp component 73 would accompany this movement of the conduit because that component is connected to the conduit by the slip-coupling spring 74. However the stop 70 prevents that accompanying movement and the movement of the illustrated end portion of the conduit consequently takes place relative to the clamp component, thereby effecting the required compensating adjustment. The provision of the stop 70 and its described action make it unnecessary for the jaws of the clamp to be provided with sliding toothed elements and associated biasing spring as in FIG. I. As in the FIG. 1 embodiment, the conduit is formed at least in part by a single circular-section helically wound wire. The compression spring 79 and the other parts shown in FIG. VII, which have not been described, substantially correspond with parts shown in FIG. I and need no further description.

As a further example of means (ii) allowing change in the end-of-cycle position at which the conduit is engaged by the slip coupling, such means may be designed on a rotation principle. Thus, the clamp component can engage a thread on the conduit and a rotational movement can be imparted to the clamp component on each closure thereof, e.g. by providing the clamp component with portions which co-operate with cam faces on a fixed part of the clamp.

While the illustrated mechanisms have been described with particular reference to their function in compensating for clutch wear, their self-adjusting action is effective for compensating for wear at other locations in a clutch control installation.

While the invention has been described in its application to engine clutch control, a control cable with associated self-adjustment facility according to the invention can be used for the remote control of other elements or devices in which similar conditions occur which make an automatic adjustment facility beneficial.

I claim:

1. An engine clutch control cable which comprises a flexible movement-transmitting core (1,33,50,58,71) within a flexible guiding conduit (2,35,49,57,78) and which is associated with a self-adjustment device comprising a clamp (3) via which the conduit can be connected to an abutment (4,30,38,60,77) for sustaining reaction load on the conduit (2,35,49,57,78), which clamp automatically closes and opens in dependence on axial advance and retraction movements respectively of a component (5,41,62,73) of the clamp (3) during a movement cycle of the cable core (1,33,50,58,71) when the cable is in use, characterised in there is a slip coupling (9,51-52,74) between said clamp component (5,41,62,73) and the conduit (2,35,49,57,78) of the cable, by which coupling, when the cable is in use, axial advancing motion of a part of said conduit which occurs responsive to application of load to the cable at the start of the clutch-disengaging stroke of the core (1,33,50,58,71) is transmitted from conduit part to said clamp component (5,41,62,73) thereby advancing such component, and such transmited motion results in closure of the clamp (3); and in that there is (i) means (27,45,66,79) for biasing said conduit part towards retraction from the clamp, and (ii) means (17-18,24; 47-48; 70) which allows the position along said conduit (2,35,49,57,78) at which it is engaged by said slip coupling (9,51-52,74) when the control is in its rest position to alter from cycle to cycle under end-of-cycle load on the cable resulting from clutch wear.

2. A cable according to claim 1, wherein the clamp component (5,41,62,73) which engages the conduit (2,35,49,57,78), and the conduit itself, have inter-engaging teeth (25-26,47-48).

3. A cable according to claim 1 or 2, wherein the clamp (3) has an axial open-ended conduit passageway allowing the self-adjustment facility to function with the cable conduit (2,49,57) extending right through the clamp.

4. A control cable according to claim 1 or 2, wherein said means which allows alteration of the position at which the conduit is engaged by the slip coupling is means (17-18,24; 47) which is associated with said axially displaceable clamp component (5,41,62) and which causes the part of the conduit (2,35,49,57) with which is co-operates to undergo an axial advance movement against the resistance of said slip coupling, during each movement of said clamp component to cause closure of the clamp.

5. A control cable according to claim 4, wherein the clamp component (41,62) which engages the conduit (49,57), and the conduit itself, have inter-engaging teeth (47-48) which are so shaped that a said axial advance movement of the co-operating part of the conduit against the resistance of said slip coupling, is imparted to said conduit part by cam action as the teeth of the clamp component move into intermeshing engagement with said conduit teeth.

6. A control cable according to claim 5, wherein the teeth (47,48) have one inclined flank (54) forming a cam face, and an opposed undercut flank (55).

7. A control cable according to claim 1 or 2, wherein the said means which allows alteration of the position at which the conduit is engaged by the slip coupling comprises a stop (70) which is located on the core (71) of the cable and restrains the said clamp component (73) from end-of-cycle axial advance motion together with the adjacent part (7) of the conduit under residual load imposed by a clutch clamping spring.

8. A control cable according to claim 1 or 2, wherein the part of the conduit (2,35,49,57,78) with which said clamp component (5,41,62,73) co-operates is a substantially rigid part.

9. An engine clutch control cable which comprises a flexible movement-transmitting core (1,33,50,58,71) within a flexible guiding conduit (2,35,49,57,78) and which is associated with a self-adjustment device comprising a clamp (3) via which the conduit can be connected to an abutment (4,30,38,60,77) for sustaining reaction load on the conduit (2,35,49,57,78), which clamp automatically closes and opens in dependence on axial advance and retraction movement of a component (5,41,62,73) of the clamp during a movement cycle of the cable core (1,33,50,58,71) when the cable is in use, characterised in that there is means (9,51,52,74) which exerts resilient contact pressure between said clamp component (5,41,62,73) and the surface of the conduit (2,35,49,57,78) and thereby forms between said clamp component and the conduit a slip coupling which when the cable is in use, transmits force from said conduit to said clamp component (5,41,62,73) during a first part of each clutch-disengaging stroke of the core (1,33,50,58,71) thereby to impart to said clamp component a said axial advance movement which results in closure of the clamp (3).

10. A cable according to claim 9, wherein the clamp incorporates means (17-18, 24; 47-48) which allows the position along said conduit (2,35,49,57) at which it is engaged by said slip coupling (9,51-52) when the control is in its rest position to alter from cycle to cycle under end-of-cycle load on the cable resulting from clutch wear.

11. A cable control according to claim 10, wherein the clamp component (41,62) and the conduit (49,57) have inter-engaging teeth (47,48) so shaped that as the clamp teeth move against the conduit teeth, the clamp teeth impart an axial advance movement to the co-operating part of the conduit by cam action, against the resistance of said slip coupling.

12. A cable according to claim 9, wherein on the cable core (71) there is a stop (70) for preventing said clamp component (73) from advancing in the clamp together with the adjacent part of the conduit (78) when that part is caused to advance by residual load imposed by a clutch clamping spring.

13. Apparatus comprising an engine clutch and a clutch control cable; said cable comprising a flexible movement-transmitting core (1,33,50,58,71) within a flexible guiding conduit (2,35,49,57,78) and being associated with a self-adjustment device comprising a clamp (3) via which the conduit is connected to an abutment (4,30,38,60,77) for sustaining reaction load on the conduit (2,35,49,57,78), which clamp automatically closes and opens in dependence on axial advance and retraction movement of a component (5,41,62,73) of the clamp during a movement cycle of the cable core (1,33,50,58,71); said clamp component (5,41,62,73) carrying means (9,51,74) which is resiliently urged against the surface of the conduit and thereby forms between said clamp component and said conduit a slip coupling which during a first part of each clutch-disengaging stroke of the core transits reaction load on said conduit to said clamp component thereby to impart to such clamp component a said axial advance movement which results in closure of the clamp (3); and said apparatus including means (27,45,66,79) for biasing the cable conduit towards retraction from the clamp, and means which allows the position along said conduit (2,35,49,57,78) at which it is contacted by said slip coupling means (9,51-52,74) when the control is in its rest position to alter from cycle to cycle under end-of-cycle load on the cable resulting from clutch wear.

14. Apparatus according to claim 13, wherein said means which allows said alteration of the position at which said conduit (2,35,49,57,78) is contacted by said slip coupling means (9,51-52,74) is means (17-18,24; 47) which is associated with said axially displaceable clamp component (5,41,62) and which during movement of said clamp component towards its conduit-clamping position causes the part of the conduit (2,35,49,57) located within the clamp to advance slightly relative to said clamp component, against the resistance of said slip coupling.

15. Apparatus according to claim 13, wherein said means which allows said alteration of the position at which said conduit (2,35,49,57,78) is contacted by said slip coupling means (9,51-52,74) comprises a stop (70) which is located on the core (71) of the cable and restrains the said clamp component (73) from end-of-cycle axial motion together with the conduit in the event of axial motion of the conduit under the action of end-of-cycle load on the cable resulting from clutch wear.

* * * * *